Sept. 17, 1957  E. G. SCHEMPF  2,806,545
METHODS AND APPARATUS FOR SEISMIC EXPLORATION
Filed Jan. 10, 1955  3 Sheets-Sheet 1

INVENTOR.
EDWARD G. SCHEMPF
BY
Christie, Parker & Hale
ATTORNEYS

Sept. 17, 1957    E. G. SCHEMPF    2,806,545
METHODS AND APPARATUS FOR SEISMIC EXPLORATION
Filed Jan. 10, 1955    3 Sheets-Sheet 3

INVENTOR.
EDWARD G. SCHEMPF
BY
Christie, Parker & Hale
ATTORNEYS

United States Patent Office 2,806,545
Patented Sept. 17, 1957

---

2,806,545

METHODS AND APPARATUS FOR SEISMIC EXPLORATION

Edward G. Schempf, Tulsa, Okla., assignor to Precision Exploration Co., Tulsa, Okla., a corporation of Oklahoma Application January 10, 1955, Serial No. 480,886

8 Claims. (Cl. 181—.5)

This invention relates to improved methods and apparatus for seismic exploration, and it has particular reference to methods and apparatus for recording seismic information caused by a plurality of seismic disturbances so as to cause the reflected waves which are caused by the respective disturbances to be additive and to cause most of the other waves to cancel one another.

In seismic exploration, an explosion is ordinarily detonated below the surface of the earth to produce acoustic waves in the earth, and the waves which are reflected by strata located below the surface of the earth are detected at a plurality of locations along the surface of the earth. By measuring the arrival times of the acoustic waves at a plurality of locations along the surface of the earth, the location and attitude of the strata which reflect the waves can be ascertained.

In many areas, the reflected waves can be detected with ease, and records of excellent quality are obtained. However, there are many areas in which very poor reflections are detected, and in some arease no reflections can be detected at all using conventional techniques. It is believed that most of the difficulty in obtaining high quality seismic records is due to the fact that noise or other undesirable interference which is recorded at the same time that reflected energy is being recorded is of greater amplitude than reflected waves so that the reflected waves are obscured.

Reflected waves and noise waves have frequency spectra which are broad and which overlap so that the two are coextensive throughout a wide frequency range. Noise waves at the low and high frequency ends of the noise frequency spectrum ordinarily can be eliminated by the use of electrical filters in the recording apparatus. Also, in some instances noise signals having frequencies intermediate the low and high frequency ends of the noise spectrum can be eliminated by the use of filters. However, the use of filters is usually successful only when the noise frequency differs appreciably from the frequency of the reflected waves. Also, the excessive use of filters can affect the quality of the recorded information so as to make interpretation of the record difficult or impossible. Filters can be so misused as to change the time of a reflection to such an extent that the interpretation of the record is incorrect.

In some instances, multiple geophones may be used to cancel a portion of the noise energy. This is because noise energy usually approaches the surface of the earth along an oblique or horizontal path, whereas reflected energy approaches the surface of the earth on a near vertical path. Such use of multiple geophones has not been very successful because the noise signals are usually much stronger than the reflected signals, and hence there is a very poor signal to noise ratio which cannot be overcome by the mere use of multiple geophones.

These difficulties are overcome in the present invention by deriving seismic information from a plurality of explosions and causing the reflected energy to be additive for the various explosions while causing most of the other waves to cancel one another.

The reflected waves arrive at the surface of the earth at substantially the same times after each seismic explosion, taking into consideration corrections for any difference in the depths of the explosions, whereas the noise waves which are caused by each seismic explosion are usually random in nature and hence they arrive at the surface of the earth at different times after each explosion. Most of the noise waves which are created on the surface of the earth, such as by wind, by automobiles, and by waves on a beach, are also of random nature. Thus, when the information which is derived from a plurality of seismic explosions is superimposed or integrated, the reflected waves will be additive and most of the noise waves will cancel out.

Preferably the explosions are detonated at different depths along one or more bore holes for each seismic setup. The explosions at different depths cause noise waves to arrive at locations along the surface of the earth at different times for different explosions. Also, explosions at different depths cause energy which is reflected by near surface irregularities such as fractures, buried topography, solution caverns and concretions to arrive at the individual detectors at different times for shots at different depths. Energy which is reflected from strata below the surface of the earth arrives at the surface of the earth at substantially the same time after each explosion provided the times are corrected for the difference in depth of the shots. Thus, by creating seismic explosions at various depths along a bore hole and providing corrections for any difference in depth between the various explosions, the reflections will have substantially the same time relationship and the noise signals will occur at random times. If the signals arriving at each detector location are mixed or integrated, the reflected energy will be additive, and the other energy will tend to cancel out.

I prefer to cause the seismic information to be integrated as the shooting progresses at each location. This requires a minimum of equipment in order to effect the integration, and it has the additional advantage that the operator can ascertain when enough information has been recorded at any particular seismic setup.

In order to cause the information to be integrated as the shooting progresses, the signals which are detected as a result of the first shot are recorded on a suitable medium such as magnetic tape. These signals are then mixed with the signals which are detected as a result of the second shot to provide an integrated record of the signals. Thereafter, the respective signals which are detected in response to subsequent shots are mixed with the corresponding signals of the integrated record. The operator continues this process until he attains a record on which reflections can be ascertained with ease.

I prefer to employ magnetic tape as the recording medium because it is particularly suitable for use in field operations. One convenient arrangement for using magnetic tape is to employ half of the width of the tape for storing the signals which are to be played back and integrated with the signals currently being detected, so that the next integrated record may be recorded on the other half of the tape.

Although I prefer to integrate the seismic information which is derived from the various explosions while the seismic information after each explosion is being detected, it will be apparent that the seismic information may be integrated in other manners. By way of example, the information derived from each seismic explosion may be recorded independently without any mixing or integration. Then the various records may be integrated with one another in sequence to produce a record wherein the reflected energy is additive and the other energy tends to cancel out. The latter arrangement requires more equipment than my preferred method of integrating the information in the field as the shooting progresses.

The invention is explained in more detail with reference to the drawings, in which.

Figure 1:
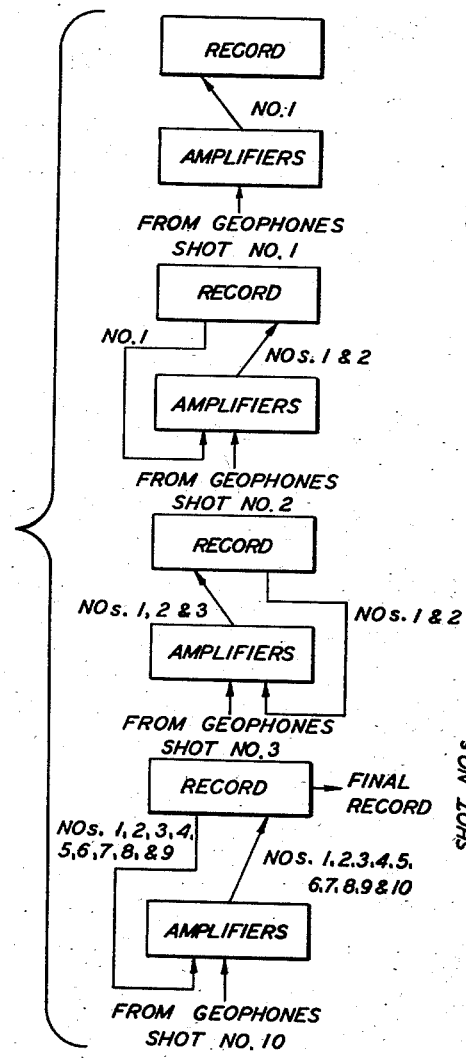
Fig. 1 is a block diagram illustrating the integration or mixing procedure for a plurality of seismic shots.

With reference to Fig. 1, the block labeled "record" indicates a recording medium, such as magnetic tape, which is divided into two halves. The seismic information which is detected by the geophones in response to shot No. 1 is recorded on the left-hand half of the record. Then this information is played back and mixed with the corresponding signals which are detected by the geophones in response to shot No. 2 to produce an integrated record on the right-hand half of the record. Then the information on the right-hand half of the record is played back and mixed or integrated with the corresponding signals which are derived from the geophones in response to shot No. 3, and this information is recorded on the left-hand half of the record.

This procedure is continued until the operator decides that enough information has been recorded to provide a final record on which reflections can be ascertained with ease. In Fig. 1 it is assumed that ten shots were adequate. Thus, the integrated record of shots 1 to 9 on the left-hand half of the record is played back and mixed with the corresponding signals derived from the geophones in response to shot No. 10 to provide an integrated record on the right-hand half of the record, which contains the information derived from all of the shots. The signals recorded on the final integrated record may be sensed and recorded in the form of traces on a conventional-type seismic record for final interpretation.

Figure 2:
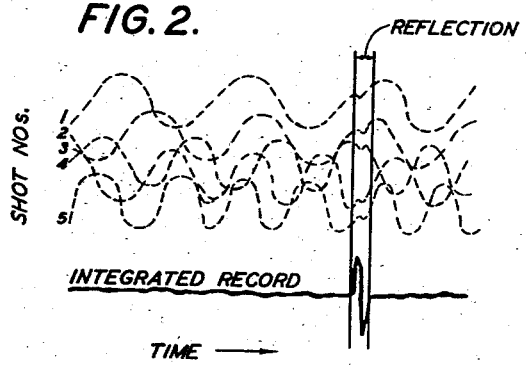
Fig. 2 shows the signals which may be obtained at a single detector location in response to a plurality of seismic shots.

Fig. 2 illustrates the signals that may be recorded in a single channel in response to a plurality of seismic shots. It will be noted that the noise signals are random in nature, but that the reflected signals all occur at substantially the same time. Hence, an integrated record of such signals would cause the reflected components to be additive and it would cause most of the noise components to cancel out.

Figure 3:
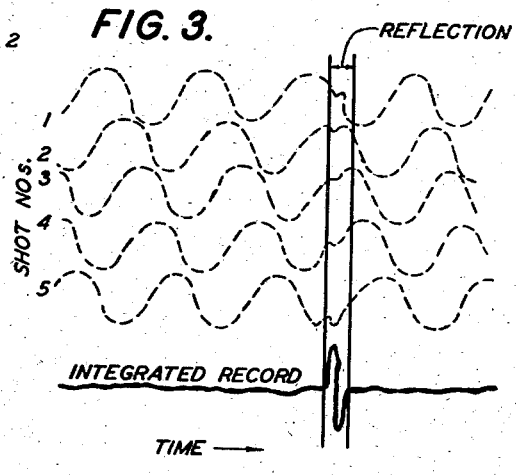
Fig. 3 illustrates another type of signals that may be obtained at a single detector location in response to a plurality of shots.

Fig. 3 illustrates the signals that may be received in a single channel in response to a plurality of shots in a location such that the noise signals are of a single frequency but occur at different times after different shots. Again, on an integrated record, the reflected waves are additive and the noise signals tend to cancel out.

Figure 4:
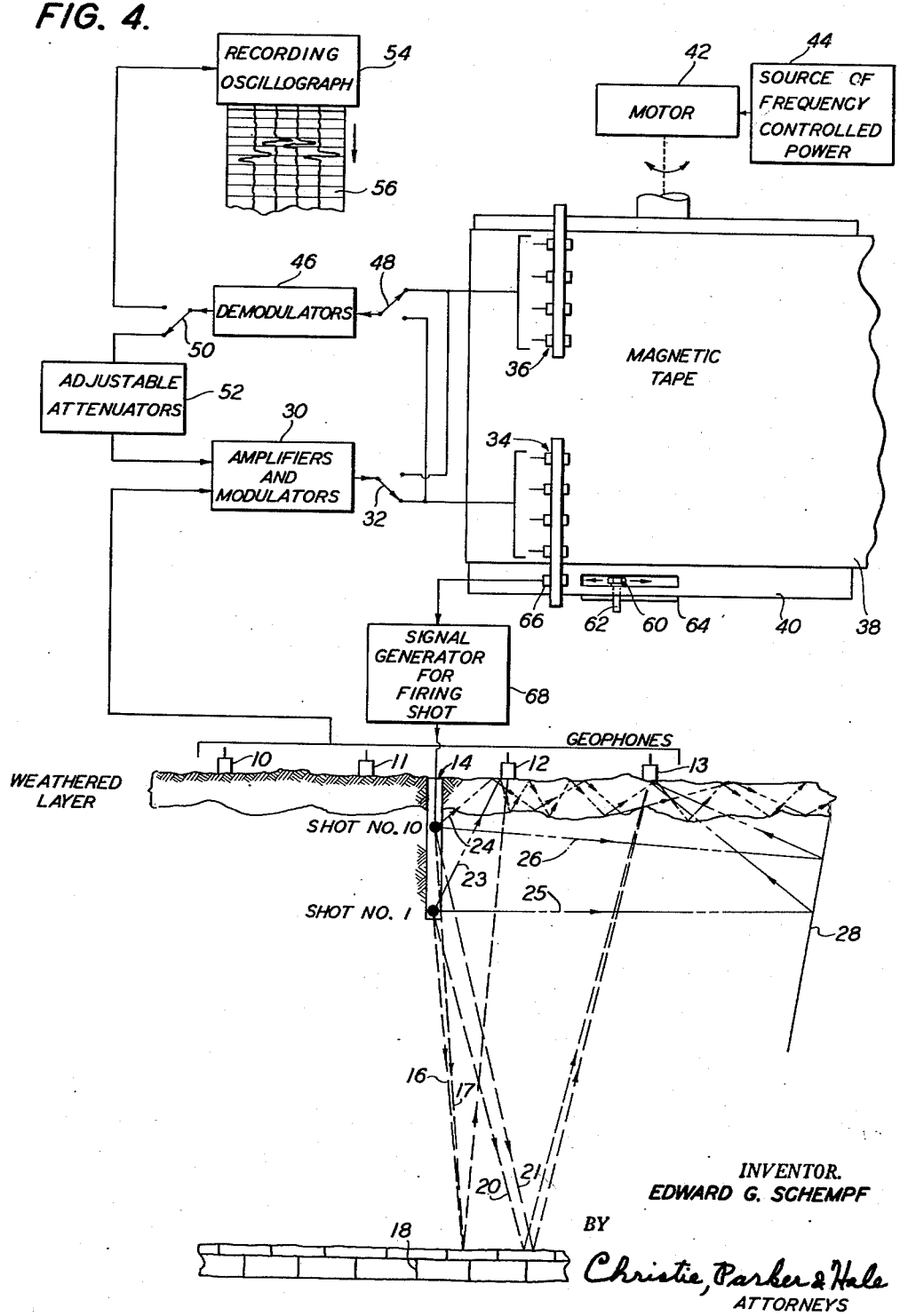
Fig. 4 shows one form of apparatus that may be employed in carrying out the preferred method of the present invention.

Fig. 4 illustrates a seismic setup wherein a plurality of geophones 10 to 13 are located adjacent a bore hole 14 in which explosive shots are detonated. In practicing my invention, it is usually desirable to shoot at the bottom of the bore hole first and then shoot at locations progressively higher in the bore hole until enough seismic information has been obtained. However, any desired sequence of shots may be employed in practicing my invention.

The drawing illustrates the locations at which shots No. 1 and No. 10 might be detonated. The rays 16 and 17 show the paths along which seismic energy would travel from shots No. 1 and No. 10 to the reflecting interface of the stratum 18 to be reflected to the geophone 12. The energy from these two shots is also propagated along the paths 20 and 21 and reflected to the geophone 13. The reflected energy which is caused as the result of shot No. 1 and shot No. 10 arrives at the individual geophones at substantially the same time after the respective shots provided the times are corrected for the difference in depth between the two shots. The time correction is the increase in time required for the shot energy to travel from shot No. 10 position to shot No. 1 position. The balance of the travel time will be the same. Thus, the corrections are easy to make.

Noise energy travels along paths such as indicated by the rays 23 and 24, and these noise signals arrive at the respective geophones at random and different times after the respective shots. Such waves may be propagated along the weathered layer as illustrated. Also, the energy which travels along the ray paths 25 and 26 to be reflected by a near-surface interface 28 arrives at the geophones at different times for shots at different depths. Reflected energy of this type may be caused by fractures, buried topography, solution caverns and concretions.

Noise signals which are caused by wind, automobiles, waves along a shore, and the like, are also random in nature and will tend to cancel out the same as noise signals which result from the explosion.

It will be apparent that reflected energy and noise energy will also arrive at the locations of geophones 10 and 11. The ray paths for that portion of the geophone spread are not shown in order to simplify the disclosure.

In order to integrate or mix the signals which are detected at the individual geophone locations in response to the various shots, the output of the geophones is applied to the input circuit of a set of conventional amplifiers and modulators 30 which amplify and frequency-modulate the signals produced by the respective geophones in separate channels. The gain of such amplifiers is adjustable so as to permit adjustment of the relationship of the strength of signals which are integrated or mixed in the respective amplifiers. The percentage of modulation of such modulators is ordinarily adjustable so that the percentage of modulation may be selected as desired. The output of the amplifiers and modulators 30 is connected to a switching circuit 32 which connects to either of the sets 34 and 36 of heads for recording and reading information on a magnetic tape 38.

The magnetic tape is moved at a substantially constant speed by a drum 40 which is rotated by a motor 42. The motor is energized by a source 44 of power. Preferably this source of power is frequency controlled so as to cause the motor and the drum to rotate at a substantially constant speed.

A set of demodulators 46 may be connected to either set of the heads through a switching circuit 48. The demodulators serve to demodulate the signals which are detected by the reading heads. The output of the demodulators may be applied through a switching circuit 50 and through a set of adjustable attenuators 52 to the input of the amplifiers and modulators 30 so as to mix or integrate the signals which are being read from the magnetic tape with signals which are applied from the geophone spread to the input circuit for the amplifier and modulators 30. The attenuators 52 may be adjusted so as to provide the desired signal strength for mixing with the incoming signals from the geophones.

The output of the demodulator 46 may also be connected through the switching circuit 50 to a recording oscillograph 54 which serves to produce a record 56 showing the seismic information in the form of traces which can be inspected visually and having timing lines so that the time of occurrence and the moveout of each reflection can be ascertained.

Figure 5:
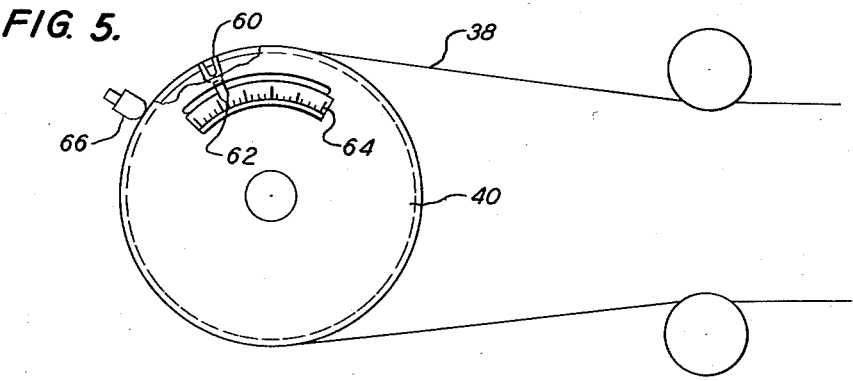
Fig. 5 is an end view, partially broken away, showing the drum for moving the magnetic tape of Fig. 4.

In order to integrate or mix signals which are detected by the geophones as a result of a seismic shot with previously recorded signals on the magnetic tape, the firing of the shot is synchronized with the playback of the previously recorded signals. Such synchronization may be effected in various ways. One arrangement is shown in Figs. 4 and 5, wherein a magnet 60 is mounted in a slot adjacent the outer periphery of the drum. The location of the magnet in the slot may be adjusted by moving the pointer 62, and the location of the magnet may be ascertained by ascertaining the location of the pointer 62 along a scale 64.

A transducer head 66 serves to provide an output signal when the magnet 60 passes under it. This output signal is applied to a signal generator 68 which provides a signal for firing the shot. Thus, the respective shots may be fired in synchronization with movement of the magnetic tape. The time at which the shot is fired may be adjusted by moving the pointer 62 so as to correct for differences in the depths of the respective shots.

It will be apparent that other synchronization arrangements may be employed. By way of example, the magnet may be fixed, and the location of the transducer head 66 may be adjusted. Also, the locations of the two sets 34 and 36 of heads may be adjusted.

Figure 6:
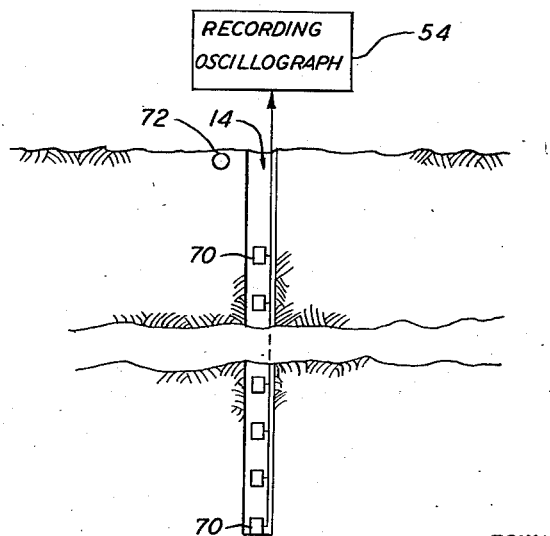
Fig. 6 shows one arrangement for ascertaining the time required for a seismic disturbance to travel from location to location along a bore hole.

The time correction which is required for shots at different depths may be measured with the arrangement shown in Fig. 6. A plurality of geophones 70 are positioned in the bore hole at the locations at which the various shots are to be fired. A small explosion is created at the location 72 and the arrival times of the seismic energy at the respective geophones is recorded by the recording oscillograph 54. The time differentials which are recorded by the geophones at the various locations along the bore hole indicate the time correction which should be made between shots located at these positions.

Thus, the time corrections which are required for shots located at different depths along the bore hole may be measured as shown in Fig. 6, and then the corrections may be applied simply by adjusting the position of the magnet 60 of Figs. 4 and 5.

In order to carry out the preferred method of my invention, a veloctiy survey of the bore hole is made, as indicated in Fig. 6. Then the first shot may be fired at the bottom of the hole and the signals which are detected by the geophone spread are applied through the amplifiers and modulators 30 and the switching circuit 32 to the heads 34 which record the signals on the magnetic tape.

The switching circuit 32 is then reversed to apply the output of the amplifiers and modulators 30 to the heads 36. The switching circuit 48 is then connected to receive the output of the heads 34 and the switching circuit 50 positioned to apply the output of the demodulators 46 through the adjustable attenuators 52 to the input circuit of the amplifiers and modulators 30.

The second shot is lowered into position, and the position of the magnet 60 is altered so as to correct for any difference in depth between the first and second shot locations. The previously recorded information on the magnetic tape is now played back and read out by the heads 34 in synchronism with detonation of the second shot so that the previously recorded signals are mixed or integrated with the corresponding signals detected by the geophones in response to the second shot, and the mixed signals are recorded on the magnetic tape by the heads 36 to provide an integrated record of the signals. The information which was previously recorded on the other half of the magnetic tape is no longer required, and it may be erased in a conventional manner so that the next integrated record may be recorded on that half of the magnetic tape.

This procedure is repeated over and over until the operator decides that a sufficient number of shots have been detonated. Then the output of the demodulators 46 is applied through the switching circuit 50 to the recording oscillograph 54, and the integrated record of all of the shots is read off of the magnetic tape and recorded in the form of a conventional seismograph record 56, so that it may be inspected visually.

Thus, seismic information is derived from a plurality of explosions and integrated to cause the respective reflected waves to be additive and to cause random waves, such as noise, to cancel out. This permits records of good quality to be obtained in areas in which very poor reflections or no reflections at all have been obtained by conventional techniques.

The method of my invention permits the use of smaller explosive charges than are required by conventional seismograph techniques. The use of smaller charges makes it possible to shoot near or in towns or expensive installations.

Also, the method of my invention permits exploration in noisy areas such as along noisy streets and along beaches adjacent the surf, as long as the noise is random in nature.

A four-channel arrangement has been illustrated in Fig. 4 so as to simplify the disclosure. Ordinarily, a much greater number of channels, such as 24, is employed.

Also, a single geophone is illustrated at each geophone location in order to simplify the disclosure. It will be apparent that plural geophones may be employed at each location, and ordinarily it will be desirable to use more than one geophone at each location so as to minimize noise components of certain types, such as ground roll, which may be received by the geophones.

In the claims which follow, the terms "sequential integration" and integration "in sequence" refer to the mixing arrangement wherein seismic signals are integrated by mixing the signals which are derived from two seismic disturbances to form a composite record and thereafter mixing signals which are derived from other seismic disturbances with the composite record, with the sets of signals which are derived from the respective seismic disturbances being mixed or integrated one at a time and not all at the same time.

I claim:

1. Apparatus for use in seismic exploration comprising a magnetic member for recording information, means for moving the magnetic member at a substantially constant speed, two sets of heads for recording and reading information on different portions of the magnetic member, means for selectively coupling either set of the heads to an input circuit for receiving signals from a geophone spread, means for coupling the playback output of one of the sets of heads to the input circuit along with signals from a geophone spread to cause the other set of heads to record the combined signals, and means synchronized with movement of the magnetic member for producing a signal for detonating an explosive in synchronism with the playback of information which is recorded on the magnetic member from a previous explosion.

2. Apparatus for use in seismic exploration comprising a magnetic member for recording information, means for moving the magnetic member at a substantially constant speed, two sets of heads for recording and reading information on different portions of the magnetic member, means for selectively coupling either set of the heads to an input circuit for receiving signals from a geophone spread, means for coupling the playback output of one of the sets of heads to the input circuit along with signals from a geophone spread to cause the other set of heads to record the combined signals, and adjustable means synchronized with movement of the magnetic member for producing a signal for detonating an explosive in synchronism with the playback of information which is recorded on the magnetic member from a previous explosion, so that the signals produced by the geophone spread in response to detonation of the explosive may be synchronized to have the same time relationship as the playback signals.

3. Apparatus for use in seismic exploration comprising a magnetic tape for recording information, means for moving the magnetic tape at a substantially constant speed, first and second sets of heads located along different portions of the width of the magnetic tape for simultaneously recording and reading information on the magnetic tape, means for coupling the first set of the heads to an input circuit for receiving signals from a geophone spread and for coupling the playback output of the second set of heads to the input circuit to cause the combined signals to be recorded on one portion of the magnetic tape by the first set of heads, means for reversing the coupling of the heads to cause the second set to receive signals from the geophone spread and to cause the playback output of the first set to be combined with the signals from the geophone spread so that the combined signals are recorded on the other portion of the magnetic tape by the second set of heads, and means for synchronizing the playback signals with the signals from the geophone spread to cause the playback signals and the signals from the geophone spread to have the same time relationship.

4. The method of seismic exploration which comprises creating an explosion at a certain depth below the surface of the earth to create seismic energy, detecting the energy which is reflected from strata below the surface of the earth for a predetermined period of time after the explosion with a plurality of vibration detectors located along the surface of the earth, recording the signals which are produced by the individual detectors, playing back the signals so recorded, creating a second explosion at a different depth below the surface of the earth to create seismic energy a second time, with the time of the second explosion being synchronized with the play back of the previously recorded signals and corrected in time to compensate for the difference between the depths of the two explosions to cause the reflections which arrive at the surface of the earth to occur at substantially the same time as the signals which are being played back which represent the corresponding reflections, detecting the energy which is reflected from strata below the surface of the earth for a predetermined period of time after the second explosion with said vibration detectors, and simultaneously mixing and recording the play back signals and the corresponding signals produced by the individual detectors in response to the second explosion during the period of time when the detectors are producing signals in response to the second explosion to provide an integrated record wherein the reflected energy is additive and most of the noise energy cancels out.

5. The method of seismic exploration which comprises creating a plurality of successive seismic disturbances below the surface of the earth, detecting the reflected energy from each disturbance with a plurality of vibration detectors, integrating the signals received at the individual detector locations in response to two seismic disturbances to form a composite record, and thereafter building up the composite record by integrating with the composite record signals which are derived from other seismic disturbances, with the sets of signals which are derived from the respective seismic disturbances being integrated one at a time in the same time relationship after correction for any differences in the depth below the surface of the earth at which the seismic disturbances are created, until a composite record is obtained wherein most of the noise energy cancels out and the reflected energy accumulates so that it can be identified.

6. The method of seismic exploration which comprises creating a plurality of successive seismic disturbances at a plurality of depths below the surface of the earth, detecting the reflected energy from each disturbance with a plurality of vibration detectors, integrating the signals which are detected at the individual detector locations in response to two seismic disturbances to form a composite record, and thereafter building up the composite record by integrating in sequence with the composite record signals which are derived from additional seismic disturbances, with the sets of signals which are derived from the respective seismic disturbances being integrated one at a time with the composite record in the same time relationship after correction for differences in the depth below the surface of the earth at which the seismic disturbances are created, until a composite record is obtained wherein most of the noise energy cancels out and the reflected energy accumulates so that it can be identified.

7. The method of seismic exploration which comprises creating a plurality of successive seismic disturbances at a plurality of depths below the surface of the earth, detecting the reflected energy from each disturbance with a plurality of vibration detectors, recording a first set of the signals which are detected at the individual detector locations in response to one seismic disturbance, integrating a second set of the signals which are detected at the individual detector locations in response to a second seismic disturbance with the first set of signals in the same time relationship after correction for differences in the depth below the surface of the earth at which the seismic disturbances are created to form a composite record, with the second set of signals being integrated with the first set immediately after the second seismic disturbance is initiated and while the second set of signals are being detected, and thereafter building up the composite record by integrating additional sets of signals which are detected from additional seismic disturbances in sequence with the composite record, with the additional sets of signals which are detected from the respective seismic disturbances being integrated one set at a time with the composite record while the individual sets of signals are being detected and in the same time relationship after correction for differences in the depth below the surface of the earth at which the seismic disturbances are created, until a composite record is obtained wherein most of the noise energy cancels out and the reflected energy accumulates so that it can be identified.

8. The method of seismic exploration involving creating explosions in a bore hole which comprises measuring the time intervals required for seismic energy to travel between selected locations along the bore hole, creating a first explosion in the bore hole at a depth having a predetermined relationship to said selected locations along the bore hole, detecting the seismic energy which results for a period of time after the first explosion with a plurality of vibration detectors, recording the signals which are detected in response to the first explosion, creating a second explosion in the bore hole at a depth having a predetermined relationship to said selected locations along the bore hole, with the depth of the second explosion being different from that of the first explosion, detecting the seismic energy which results for a period of time after the second explosion with said vibration detectors, integrating the respective signals which are detected in response to the second explosion with the corresponding previously recorded individual signals while the signals are being detected to produce a composite record, and thereafter building up the composite record as the shooting progresses by successively integrating the respective signals which are detected in response to subsequent explosions with the corresponding signals of the composite record, with the sets of signals which are detected from the respective explosions being integrated one set at a time with the composite record as the shooting progresses and while the individual sets of signals are being detected and in the same time relationship after correction for differences in the depths of the various explosions in accordance with the previously measured time intervals required for seismic energy to travel along the bore hole.

References Cited in the file of this patent

UNITED STATES PATENTS

| | | |
|---|---|---|
| 2,018,737 | Owen | Oct. 29, 1935 |
| 2,059,018 | North | Oct. 27, 1936 |
| 2,276,306 | Hoover et al. | Mar. 17, 1942 |
| 2,450,366 | Williams | Sept. 28, 1948 |
| 2,732,906 | Mayne | Jan. 31, 1956 |
| 2,767,389 | McCollum | Oct. 16, 1956 |

OTHER REFERENCES

Dix: "Seismic Prospecting For Oil," Harper & Brothers, 1952, pages 73, 74, 75 and 76.

Handley: "How magnetic recording aids seismic operations," Oil and Gas Journal, January 11, 1954, pages 158–159, vol. 52, No. 36.

Palmer: "A new approach to seismic exploration," World Oil, June 1954, vol. 138, No. 7, pages 140, 142, 146, 148, 151, 152, 154, 156, 158.